United States Patent
Hrabak et al.

(10) Patent No.: US 11,254,286 B2
(45) Date of Patent: Feb. 22, 2022

(54) SYSTEM AND METHOD TO DISABLE AUTOMATED DRIVING MODE BASED ON VEHICLE OPERATION CONTEXT

(71) Applicant: GM GLOBAL TECHNOLOGY OPERATIONS LLC, Detroit, MI (US)

(72) Inventors: Robert A. Hrabak, Sterling Heights, MI (US); Timothy Joseph Jurkiw, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 288 days.

(21) Appl. No.: 16/572,684

(22) Filed: Sep. 17, 2019

(65) Prior Publication Data
US 2021/0078531 A1 Mar. 18, 2021

(51) Int. Cl.
| | |
|---|---|
| *B60W 50/12* | (2012.01) |
| *B60R 25/01* | (2013.01) |
| *G06F 21/43* | (2013.01) |
| *H04W 4/08* | (2009.01) |
| *G05D 1/00* | (2006.01) |

(52) U.S. Cl.
CPC .............. *B60R 25/01* (2013.01); *G06F 21/43* (2013.01); *G05D 1/0088* (2013.01); *G05D 2201/0213* (2013.01)

(58) Field of Classification Search
CPC ........ B60W 40/09; B60W 50/12; H04W 4/08; H04W 4/40; G06F 21/43; B60R 25/01
See application file for complete search history.

(56) References Cited

U.S. PATENT DOCUMENTS

| | | | |
|---|---|---|---|
| 8,760,300 B2 | 6/2014 | Sezanayev | |
| 9,019,107 B2 | 4/2015 | Biondo et al. | |
| 9,925,872 B1 | 3/2018 | Alasry et al. | |
| 9,975,552 B2 | 5/2018 | Biondo et al. | |
| 2012/0228047 A1 | 9/2012 | White et al. | |
| 2014/0156133 A1 | 6/2014 | Cullinane et al. | |
| 2015/0239357 A1* | 8/2015 | Huntzicker | H04L 63/062 701/22 |
| 2017/0021837 A1 | 1/2017 | Ebina | |
| 2017/0090475 A1 | 3/2017 | Choi et al. | |
| 2017/0225567 A1 | 8/2017 | Tsuda | |
| 2017/0234689 A1 | 8/2017 | Gibson et al. | |
| 2017/0261981 A1 | 9/2017 | Ichikawa et al. | |
| 2018/0046185 A1 | 2/2018 | Sato et al. | |
| 2018/0174486 A1 | 6/2018 | Huntzicker et al. | |
| 2018/0237027 A1 | 8/2018 | Lundsgaard | |
| 2018/0326992 A1 | 11/2018 | Aoi et al. | |

(Continued)

OTHER PUBLICATIONS

U.S. Appl. No. 16/240,945, filed Jan. 7, 2019.

*Primary Examiner* — Tan Q Nguyen
(74) *Attorney, Agent, or Firm* — Lorenz & Kopf, LLP (57) ABSTRACT

One general aspect includes a system to restrict vehicle operations, the system including: a memory configured to include one or more executable instructions and a processor configured to execute the executable instructions, where the executable instructions enable the processor to carry out the following steps: receiving a vehicle-occupant credential; determining whether the vehicle-occupant credential triggers an operation constraint; and when the operation constraint is triggered, restricting a vehicle from operating in an autonomous driving mode.

18 Claims, 4 Drawing Sheets

(56) References Cited

U.S. PATENT DOCUMENTS

| | | |
|---|---|---|
| 2018/0356817 A1* | 12/2018 | Poeppel ............... G05D 1/0061 |
| 2019/0025825 A1 | 1/2019 | Takahama |
| 2019/0041850 A1 | 2/2019 | Chase et al. |
| 2019/0047588 A1 | 2/2019 | Yabuuchi et al. |
| 2019/0049954 A1* | 2/2019 | Mitchell ............... G05D 1/0297 |
| 2019/0049955 A1 | 2/2019 | Yabuuchi et al. |
| 2019/0056731 A1 | 2/2019 | Westbrook |
| 2019/0064805 A1* | 2/2019 | Frazzoli ............... G05D 1/0061 |
| 2019/0071044 A1 | 3/2019 | Nezaki et al. |
| 2019/0077419 A1 | 3/2019 | Samma et al. |
| 2019/0092341 A1 | 3/2019 | Stark et al. |
| 2019/0184981 A1 | 6/2019 | Jung et al. |
| 2019/0225236 A1* | 7/2019 | Hashimoto ........... B60W 30/09 |
| 2019/0241099 A1 | 8/2019 | Sugiyama et al. |
| 2019/0241196 A1 | 8/2019 | Yamamoto et al. |
| 2020/0019163 A1* | 1/2020 | Horii ..................... G08G 1/16 |
| 2020/0062265 A1* | 2/2020 | Wunderlich ...... B60W 60/0051 |
| 2020/0231182 A1* | 7/2020 | Oba .................. B60W 60/0053 |

* cited by examiner

SYSTEM AND METHOD TO DISABLE AUTOMATED DRIVING MODE BASED ON VEHICLE OPERATION CONTEXT

INTRODUCTION

Autonomous driving can make life easier when someone wants to get from point A to point B. However, there are certain situations in which allowing a vehicle to drive itself would be inappropriate or has been regulated against. For example, when a student is learning how to manually drive a vehicle or is taking their driving exam. It would thus be beneficial to prohibit the vehicle from driving in autonomous mode to ensure the student is effectively using their time to learn the techniques of manual operation as well as remove any temptation to use the autonomous driving mode to cheat on their driving exam. It is therefore desirable to restrict the usage of a vehicle's autonomous driving mode based on the context in which the vehicle is being operated. Moreover, other desirable features and characteristics of the present invention will become apparent from the subsequent detailed description of the invention and the appended claims, taken in conjunction with the accompanying drawings and this background of the invention.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method to restrict vehicle operations, the method including: receiving, via a processor, a vehicle-occupant credential; determining, via the processor, whether the vehicle-occupant credential triggers an operation constraint; and when the operation constraint is triggered, via the processor, restricting a vehicle from operating in an autonomous driving mode. Other embodiments of this aspect include corresponding computer systems, apparatus, and computer programs recorded on one or more computer storage devices, each configured to perform the actions of the methods.

Implementations may include one or more of the following features. The method further including: when the operation constraint is triggered, via the processor, providing a notification configured to inform a vehicle occupant the vehicle is restricted from operating in the autonomous driving mode. The method further including: when the operation constraint remains untriggered, via the processor, allowing the vehicle to operate in both the autonomous driving mode and manual driving mode. The method further including: based on the vehicle-occupant credential, via the processor, receiving a vehicle-operation permission; and determining, via the processor, whether the vehicle-operation permission triggers the operation constraint. The method where the vehicle-occupant credential includes a virtual vehicle key and identity information. The method where the vehicle-operation permission is received from a remote entity. The method where the vehicle-occupant credential is received from a mobile computing device. Implementations of the described techniques may include hardware, a method or process, or computer software on a computer-accessible medium.

One general aspect includes a system to restrict vehicle operations, the system including: a memory configured to include one or more executable instructions and a processor configured to execute the executable instructions, where the executable instructions enable the processor to carry out the following steps: receiving a vehicle-occupant credential; determining whether the vehicle-occupant credential triggers an operation constraint; and when the operation constraint is triggered, restricting a vehicle from operating in an autonomous driving mode. Other embodiments of this aspect include corresponding computer systems, apparatus, and computer programs recorded on one or more computer storage devices, each configured to perform the actions of the methods.

Implementations may include one or more of the following features. The system further including: when the operation constraint is triggered, providing a notification configured to inform a vehicle occupant the vehicle is restricted from operating in the autonomous driving mode. The system further including: when the operation constraint remains untriggered, allowing the vehicle to operate in both the autonomous driving mode and manual driving mode. The system further including: based on the vehicle-occupant credential, receiving a vehicle-operation permission; and determining whether the vehicle-operation permission triggers the operation constraint. The system where the vehicle-occupant credential includes a virtual vehicle key and identity information. The system where the vehicle-operation permission is received from a remote entity. The system where the vehicle-occupant credential is received from a mobile computing device. Implementations of the described techniques may include hardware, a method or process, or computer software on a computer-accessible medium.

One general aspect includes a non-transitory and machine-readable medium having stored thereon executable instructions adapted to restrict vehicle operations, which when provided to a processor and executed thereby, causes the processor to carry out the following steps: receiving a vehicle-occupant credential; determining whether the vehicle-occupant credential triggers an operation constraint; and when the operation constraint is triggered, restricting a vehicle from operating in an autonomous driving mode. Other embodiments of this aspect include corresponding computer systems, apparatus, and computer programs recorded on one or more computer storage devices, each configured to perform the actions of the methods.

Implementations may include one or more of the following features. The non-transitory and machine-readable memory further including: when the operation constraint is triggered, providing a notification configured to inform a vehicle occupant the vehicle is restricted from operating in the autonomous driving mode. The non-transitory and machine-readable memory further including: when the operation constraint remains untriggered, allowing the vehicle to operate in both the autonomous driving mode and manual driving mode. The non-transitory and machine-readable memory further including: based on the vehicle-occupant credential, receiving a vehicle-operation permission; and determining whether the vehicle-operation permission triggers the operation constraint. The non-transitory and machine-readable memory where the vehicle-operation permission is received from a remote entity. The non-transitory and machine-readable memory where the vehicle-occupant credential is received from a mobile computing device. Implementations of the described techniques may include hardware, a method or process, or computer software on a computer-accessible medium.

The above features and advantages and other features and advantages of the present teachings are readily apparent from the following detailed description for carrying out the teachings when taken in connection with the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Figure 1:
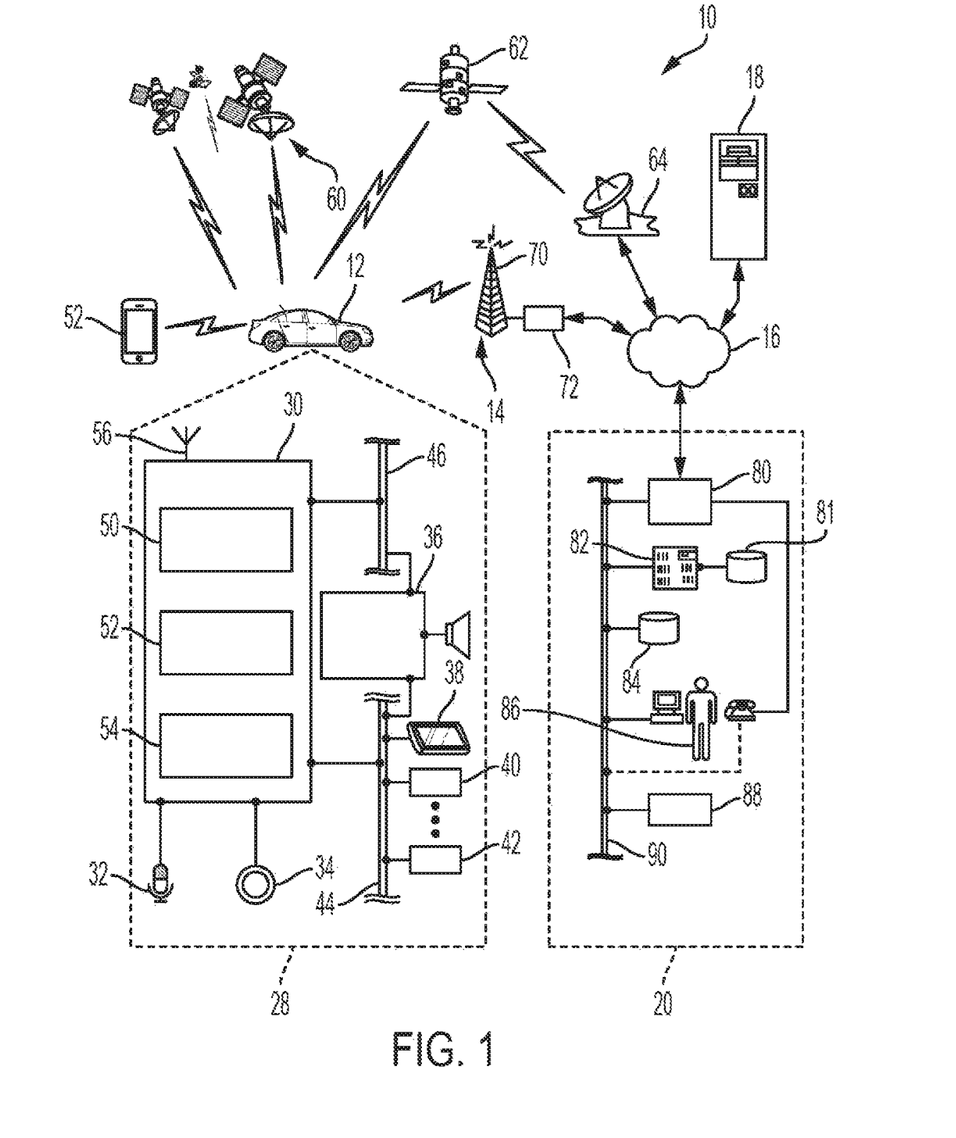
FIG. 1 is a block diagram depicting an exemplary embodiment of a communications system capable of utilizing the system and method disclosed herein.

With reference to FIG. 1, there is shown an operating environment that includes, among other features, a mobile vehicle communications system 10 and that can be used to implement the method disclosed herein. Communications system 10 generally includes a vehicle 12, one or more wireless carrier systems 14, a land communications network 16, a computer 18, and a data center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is capable of shifting between two distinct driving modes: a manual driving mode and an autonomous driving mode. The manual driving mode enables a vehicle operator to control vehicle driving operations while the vehicle traverses from one location to another. In order to do so, as is generally known, the vehicle occupant will manually interact with a steering system, braking system, transmission, and propulsion system, amongst other systems. The autonomous driving mode is carried out by the systems discussed below and is otherwise considered as a self-driving vehicle mode. Autonomous driving mode enables the vehicle 12 to traverse from one location to another without any vehicle occupant interaction(s).

Vehicle 12 be any type of double-driving mode capable vehicle such as a motorcycle, car, truck, bicycle, recreational vehicle (RV), construction vehicles (e.g., bulldozers), trains, trolleys, marine vessels (e.g., boats), aircraft, helicopters, amusement park vehicles, farm equipment, golf carts, trams, etc., and is equipped with suitable hardware and software that enables it to communicate over communication system 10. In certain embodiments, vehicle 12 may include a power train system with multiple generally known torque-generating devices including, for example, an engine. The engine may be an internal combustion engine that uses one or more cylinders to combust fuel, such as gasoline, in order to propel vehicle 12. The power train system may alternatively include numerous electric motors or traction motors that convert electrical energy into mechanical energy for propulsion of vehicle 12.

Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit 30 such as, for example, the microphone 32 and pushbutton(s) 34, whereas others are indirectly connected using one or more network connections, such as a communications bus 44 or an entertainment bus 46. Examples of suitable network connections include a controller area network (CAN), WIFI, Bluetooth and Bluetooth Low Energy, a media-oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket transceiver device that is installed in the vehicle and that enables wireless voice and/or data communication over wireless carrier system 14 and via wireless networking. This enables the vehicle to communicate with data center 20, other telematics-enabled vehicles, or some other entity or device. The telematics unit 30 preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor 86 or voice response unit at the data center 20) and data communication (e.g., to provide GPS location data or vehicle diagnostic data to the data center 20), the system can utilize a single call over a voice channel and switch as needed between voice and data transmission over the voice channel, and this can be done using techniques known to those skilled in the art.

According to one embodiment, telematics unit 30 utilizes cellular communication according to standards such as LTE or 5G and thus includes a standard cellular chipset 50 for voice communications like hands-free calling, a wireless modem for data transmission (i.e., transceiver), an electronic processing device 52, at least one digital memory device 54, and an antenna system 56. It should be appreciated that the modem can either be implemented through software that is stored in the telematics unit and is executed by processor 52, or it can be a separate hardware component located internal or external to telematics unit 30. The modem can operate using any number of different standards or protocols such as, but not limited to, WCDMA, LTE, and 5G. Wireless networking between vehicle 12 and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

One of the networked devices that can communicate with the telematics unit 30 is a mobile computing device 57, such as a smart phone, personal laptop computer, smart wearable device, or tablet computer having two-way communication capabilities, a netbook computer, or any suitable combinations thereof. The mobile computing device 57 can include computer processing capability, a transceiver capable of communicating with wireless carrier system 14, a user interface, and/or a GPS module capable of receiving GPS satellite signals and generating GPS coordinates based on those signals. User interface may be embodied as a touchscreen graphical interface capable of user interaction as well as displaying information. Examples of the mobile computing device 57 include the iPhone™ manufactured by Apple, Inc. and the Pixel™ manufactured by HTC, Inc. as well as others. While the mobile computing device 57 may include the ability to communicate via cellular communications using the wireless carrier system 14, this is not always the case. For instance, Apple manufactures devices such as the various models of the iPad™ and iPod Touch™ that include the processing capability, interface 59, and the ability to communicate over a short-range wireless communication link such as, but not limited to, WIFI and Bluetooth. However, the iPod Touch™ and some iPads™ do not have cellular communication capabilities. Even so, these and other similar devices may be used or considered a type of wireless device, such as the mobile computing device 57, for the purposes of the method described herein.

Mobile device 57 may be used inside or outside of vehicle 12, and may be coupled to the vehicle by wire or wirelessly. The mobile device also may be configured to provide services according to a subscription agreement with a third-party facility or wireless/telephone service provider. It should be appreciated that various service providers may utilize the wireless carrier system 14 and that the service provider of the telematics unit 30 may not necessarily be the same as the service provider of the mobile devices 57.

When using a short-range wireless connection (SRWC) protocol (e.g., Bluetooth/Bluetooth Low Energy or Wi-Fi), mobile computing device 57 and telematics unit 30 may pair/link one with another when within a wireless range (e.g., prior to experiencing a disconnection from the wireless network). In order to pair, mobile computing device 57 and telematics unit 30 may act in a BEACON or DISCOVERABLE MODE having a general identification (ID); SRWC pairing is known to skilled artisans. The general identifier (ID) may include, e.g., the device's name, unique identifier (e.g., serial number), class, available services, and other suitable technical information. Mobile computing device 57 and telematics unit 30 may also pair via a non-beacon mode. In these instances, the call center 20 may participate in pairing mobile computing device 57 and telematics unit 30. For example, the call center 20 may initiate the inquiry procedure between the telematics unit 30 and mobile computing device 57. And call center 20 may identify mobile computing device 57 as belonging to the user of vehicle 12 and then receive from the mobile computing device 57 it's unique mobile device identifier and authorize the telematics unit 30 via the wireless communication system 14 to pair with this particular ID.

Once SRWC is established, the devices may be considered bonded as will be appreciated by skilled artisans (i.e., they may recognize one another and/or connect automatically when they are in a predetermined proximity or range of one other. In other words—they may become, at least temporarily, network participants). Call center 20 may also authorize SRWC on an individual basis before completion. This unique pairing, for example, allows mobile computing device 57 to act as the virtual key fob briefly mentioned above. To illustrate how this occurs—upon receiving a request, data center 18 will generate an encrypted virtual vehicle key to permit certain vehicle access via mobile computing device 57. Data center 18 will then transmit aspects this encrypted virtual vehicle key information to both mobile computing device 57 and the PEPS module 42 via telematics unit 30. After paring has been established, mobile computing device 57 will send its virtual vehicle key aspect to telematics unit 30 for recognition in light of its stored corresponding virtual key aspect and in turn a handshake technique will occur that can enable the PEPS module to establish mobile computing device 57 as the acting key fob for vehicle 12. Data center 18 may also transmit one or more time parameters with the encrypted virtual vehicle key information so as to temporarily establish the virtual vehicle key of mobile device 57.

Data center 18 may further establish parameters within the encrypted virtual vehicle key information so as to restrict one or more driving modes of vehicle 12 (e.g., autonomous driving mode or manual driving mode). For example, the virtual vehicle key may be configured to restrict vehicle 12 from being operated in the autonomous driving mode. Such parameters can, for example, be set by the owner of vehicle 12 upon communicating with data center 18. The virtual vehicle key of mobile device 57 may also be associated with identity information of the device's owner (e.g., the vehicle occupant). The identity information may, for example, include information similar to that found on a driver license such as the vehicle occupant's name, date of birth, eye color, hair color, height, weight, sex, driving restrictions. The identity information may also include an indication of whether the occupant has a valid driver license or driving permit issued by an authorized jurisdiction (i.e., to define the vehicle occupant's driving entitlements). This information may be provided to mobile computing device 57 and may be validated by data center 20 upon corresponding with the department of motor vehicles (or the equivalent) corresponding to the jurisdiction of residency for the vehicle occupant.

Telematics Controller 52 (processor) can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Telematics Controller 52 executes various types of digitally-stored instructions, such as software or firmware programs stored in memory 54, which enable the telematics unit to provide a wide variety of services. For instance, controller 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services provided in connection with one or more vehicle system modules 42 (VSM); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit 30 is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to data center 20 or other remote computer system, such as computer 18, for other purposes, such as fleet management. Also, new or updated map data can be downloaded to the GPS module 40 from the data center 20 via the telematics unit 30.

Apart from the audio system 36 and GPS module 40, the vehicle 12 can include other VSMs 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests.

As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module (BCM) that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

A passive entry passive start (PEPS) module is another of the numerous of VSMs and provides passive detection of the absence or presence of a passive physical key or a virtual vehicle key. When the passive physical key approaches, the PEPS module can determine if the passive physical key is authentic as belonging to the vehicle 12. The PEPS can likewise use authentication information received from data center 20 to determine if the mobile computing device 57 with virtual vehicle key is authorized/authentic to vehicle 12. If the virtual vehicle key is deemed authentic, the PEPS can send a command to the BCM, permitting access to the vehicle 12. The PEPS can also provide passive entry health information to ensure sufficient module functionality for the passive physical key or virtual vehicle key operations. It should be understood that the PEPS may be an electronic hardware component connected to the vehicle bus 46 or, in an alternative embodiment, may be one or more software code segments uploaded to digital memory 54.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the data center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM, media streaming services (e.g., PANDORA RADIO™, SPOTIFY™, etc.), satellite radio, CD, DVD, and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions (i.e., capable of GUI implementation). Audio system 36 may also generate at least one audio notification to announce such third-party contact information is being exhibited on display 38 and/or may generate an audio notification which independently announces the third-party contact information. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more cellular network infrastructures (CNI) 72, as well as any other networking components required to connect wireless carrier system 14 with land network 16. Each cell tower 70 includes sending and receiving antennas and a base station, with the base stations from different cell towers being connected to the CNI 72 either directly or via intermediary equipment such as a base station controller. Cellular system 14 can implement any suitable communications technology, including for example, analog technologies such as AMPS, or the newer digital technologies such as, but not limited to, 4G LTE and 5G. As will be appreciated by skilled artisans, various cell tower/base station/CNI arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to data center 20. For example, land network 16 may include a public switched telephone network (PSTN) such as that used to provide hardwired telephony, packet-switched data communications, and the Internet infrastructure (i.e., a network of interconnected computing device nodes). One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, data center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer (e.g., a SIP Presence server) where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or data center 20, or both. A computer 18 can also be used for providing Internet connectivity such as DNS services or as a network address server that uses DHCP or other suitable protocol to assign an IP address to the vehicle 12.

Data center 20 is designed to provide the vehicle electronics 28 with a number of different system backend functions and, according to the exemplary embodiment shown here, generally includes one or more switches 80, servers 82, databases 84, live advisors 86, as well as an automated voice response system (VRS) 88, all of which are known in the art. These various data center components are preferably coupled to one another via a wired or wireless local area network 90. Switch 80, which can be a private branch exchange (PBX) switch, routes incoming signals so that voice transmissions are usually sent to either the live advisor 86 by regular phone, backend computer 87, or to the automated voice response system 88 using VoIP. Server 82 can incorporate a data controller 81 which essentially controls the operations of server 82. Server 82 may control data information as well as act as a transceiver to send and/or receive the data information (i.e., data transmissions) from one or more of the databases 84, telematics unit 30, and mobile computing device 57.

Controller 81 is capable of reading executable instructions stored in a non-transitory machine readable medium and may include one or more from among a processor, a microprocessor, a central processing unit (CPU), a graphics processor, Application Specific Integrated Circuits (ASICs), Field-Programmable Gate Arrays (FPGAs), state machines, and a combination of hardware, software and firmware components. The live advisor phone can also use VoIP as indicated by the broken line in FIG. 1. VoIP and other data communication through the switch 80 are implemented via a modem (i.e., a transceiver), connected between the land communications network 16 and local area network 90.

Data transmissions are passed via the modem to server 82 and/or database 84. Database 84 can store account information such as vehicle dynamics information and other pertinent subscriber information. Data transmissions may also be conducted by wireless systems, such as 802.11x, GPRS, and the like. Although the illustrated embodiment has been described as it would be used in conjunction with a manned data center 20 using live advisor 86, it will be appreciated that the data center can instead utilize VRS 88 as an automated advisor or, a combination of VRS 88 and the live advisor 86 can be used.

Figure 2:
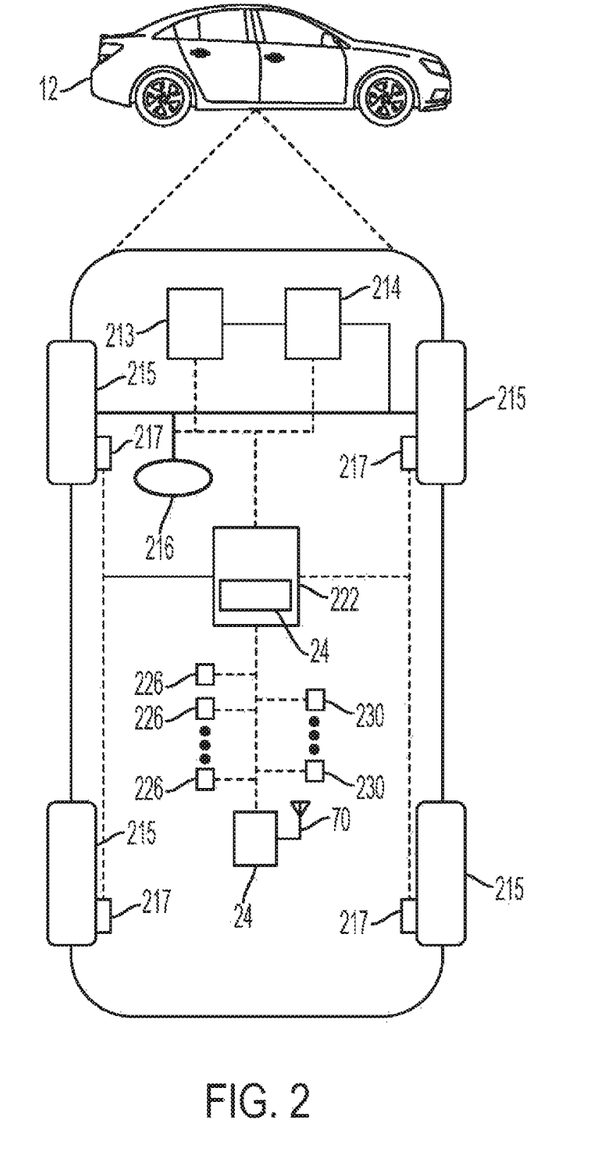
FIG. 2 is a schematic diagram of a vehicle having autonomous capabilities, according to an embodiment of the communications system of FIG. 1.

As shown in FIG. 2, communication system 10 may incorporate one or more embodiments of vehicle 12 having features to implement an autonomous driving mode. With such embodiments, in addition to the systems discussed above, vehicle 12 further includes a transmission 214 configured to transmit power from the propulsion system 213 to a plurality of vehicle wheels 215 according to selectable speed ratios. According to various embodiments, the transmission 214 may include a step-ratio automatic transmission, a continuously-variable transmission, or other appropriate transmission. The vehicle 12 additionally includes wheel brakes 217 configured to provide braking torque to the vehicle wheels 215. The wheel brakes 217 may, in various embodiments, include friction brakes, a regenerative braking system such as an electric machine, and/or other appropriate braking systems. The vehicle 12 additionally includes a steering system 216. It should be understood that each of these systems may also be operated manually, for example, when vehicle 12 is in a manual operation mode or when the autonomous driving mode is being override for emergency purposes.

Telematics unit 30 is moreover configured to wirelessly communicate with other vehicles ("V2V") and/or infrastructure ("V2I") and/or pedestrians ("V2P"). These communications may collectively be referred to as a vehicle-to-entity communication ("V2X"). In an exemplary embodiment, in addition to the communication channels listed above, this communication system is further configured to communicate via at least one dedicated short-range communications (DSRC) channel. DSRC channels refer to one-way or two-way short-range to medium-range wireless communication channels specifically designed for automotive use and a corresponding set of protocols and standards.

When vehicle 12 is in the autonomous driving mode, the propulsion system 213, transmission 214, steering system 216, and wheel brakes 217 will be in communication with or under the control of at least one controller 222. While depicted as a single unit for illustrative purposes, the controller 222 may additionally include one or more other controllers, collectively referred to as a "controller." The controller 222 may include a microprocessor such as a central processing unit (CPU) or graphics processing unit (GPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 222 in controlling the vehicle.

Controller 222 includes an automated driving system (ADS) 224 for automatically controlling various actuators in the vehicle while in an autonomous mode. Autonomous modes have been categorized into numerical levels ranging from zero (0), corresponding to no automation (i.e., full human control), to five (5), corresponding to full automation with no human control. Autonomous modes, such as cruise control, adaptive cruise control, and lane and parking assistance systems correspond to lower automation levels, while true "driverless" vehicles correspond to higher automation levels (implementing the systems discussed below).

Autonomous mode equipped vehicles having a Level Two and Level Three system can handle minor dynamic driving tasks but still require intervention from a human and may, in certain situations, require assistance from a human. As mentioned above, examples of known Level Two and Level Three systems include adaptive cruise control and lane assist systems which control certain aspects of the driving experience despite a human having their hands physically on the steering wheel. Other examples include intelligent parking assist systems (IPAS) which enable the vehicle to steer itself into a parking space with little or no input from a human. On the other hand, a Level Four system indicates "high automation", referring to the driving mode-specific performance by an automated driving system of all aspects of the dynamic driving task, even if a human driver does not respond appropriately to a request to intervene. Moreover, a Level Five system indicates "full automation", referring to the full-time performance by an automated driving system of all aspects of the dynamic driving task under all roadway and environmental conditions that can be managed by a human driver.

Figure 3:
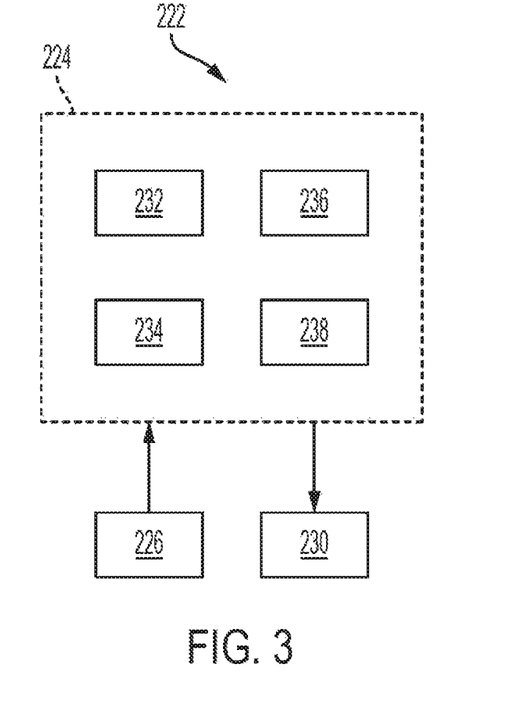
FIG. 3 is a schematic block diagram of an exemplary automated driving system (ADS) for the vehicle of FIG. 2

In an exemplary embodiment, the ADS 224 is configured to communicate automated driving information with and control propulsion system 213, transmission 214, steering system 216, and wheel brakes 217 to control vehicle acceleration, steering, and braking, respectively, without human intervention via a plurality of actuators 230 in response to inputs from a plurality of driving sensors 226, which may include GPS, RADAR, LIDAR, optical cameras, thermal cameras, ultrasonic sensors, and/or additional sensors as appropriate. In various embodiments, the instructions of the ADS 224 may be organized by function or system. For example, as shown in FIG. 3, (especially when Vehicle 12 is equipped to provide Level Four or Level Five automation) ADS 224 can include a sensor fusion system 232 (computer vision system), a positioning system 234, a guidance system 236, and a vehicle control system 238. As can be appreciated, in various embodiments, the instructions may be organized into any number of systems (e.g., combined, further partitioned, etc.) as the disclosure is not limited to the present examples.

In various embodiments, the sensor fusion system 232 synthesizes and processes sensor data and predicts the presence, location, classification, and/or path of objects and features of the environment of the vehicle 12. In various embodiments, the sensor fusion system 232 can incorporate information from multiple sensors, including but not limited to cameras, LIDARS, radars, and/or any number of other types of sensors. In one or more exemplary embodiments described herein, the sensor fusion system 232 supports or otherwise performs the ground reference determination processes and correlates image data to LIDAR point cloud data, the vehicle reference frame, or some other reference coordinate frame using calibrated conversion parameter values associated with the pairing of the respective camera and reference frame to relate LIDAR points to pixel locations, assign depths to the image data, identify objects in one or more of the image data and the LIDAR data, or otherwise synthesize associated image data and LIDAR data. In other words, the sensor output from the sensor fusion system 232 provided to the vehicle control system 238 (e.g., indicia of detected objects and/or their locations relative to the vehicle 12) reflects or is otherwise influenced by the calibrations and associations between camera images, LIDAR point cloud data, and the like.

The positioning system 234 processes sensor data along with other data to determine a position (e.g., a local position relative to a map, an exact position relative to lane of a road, vehicle heading, velocity, etc.) of the vehicle 12 relative to the environment. The guidance system 236 processes sensor data along with other data to determine a path for the vehicle 12 to follow (i.e., path planning data). The vehicle control system 238 generates control signals for controlling the vehicle 12 according to the determined path.

In various embodiments, the controller 222 implements machine learning techniques to assist the functionality of the controller 222, such as feature detection/classification, obstruction mitigation, route traversal, mapping, sensor integration, ground-truth determination, and the like.

The output of controller 222 is communicated to actuators 230 when the autonomous driving mode is activated. In an exemplary embodiment, the actuators 230 include a steering control, a shifter control, a throttle control, and a brake control. The steering control may, for example, while in the autonomous driving mode, control a steering system 216 as illustrated in FIG. 2. The shifter control may, for example, while in the autonomous driving mode, control a transmission 214 as illustrated in FIG. 2. The throttle control may, for example, while in the autonomous driving mode, control a propulsion system 213 as illustrated in FIG. 2. The brake control may, for example, while in the autonomous driving mode, control wheel brakes 217 as illustrated in FIG. 2.

Method

Figure 4:
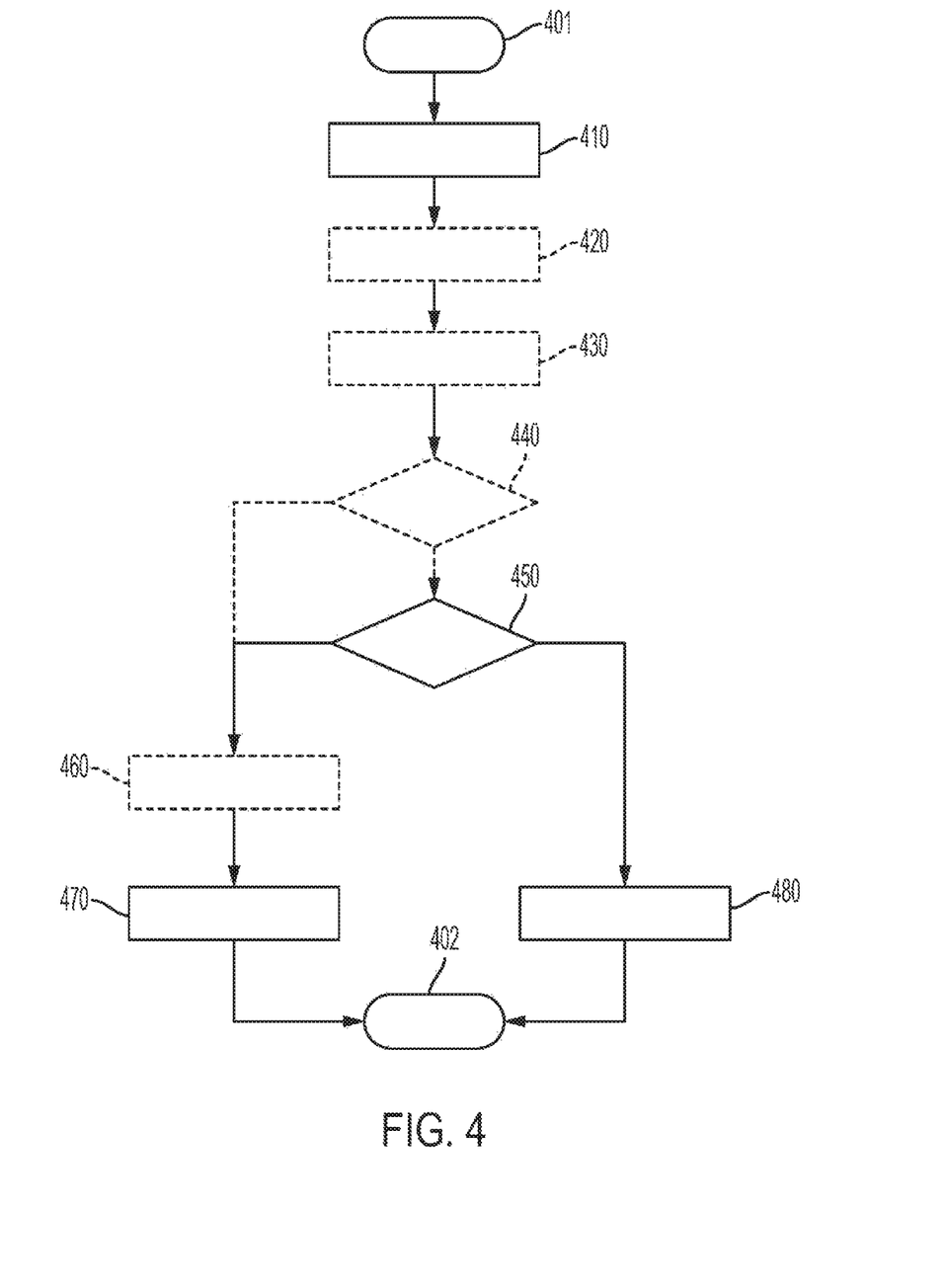
FIG. 4 is an exemplary flow chart for utilization of system and method aspects disclosed herein.

Turning now to FIG. 4, there is shown an embodiment of a method 400 to restrict a vehicle from operating in one or more aspects of an autonomous driving mode based on the context of the driving situation. Method 400 or parts thereof can be implemented in a computer program product (e.g., processor 52) embodied in a computer readable medium and including instructions usable by one or more processors of one or more computers of one or more systems to cause the system(s) to implement one or more of the method steps. The computer program product may include one or more software programs comprised of program instructions in source code, object code, executable code, or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media, which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

One or more aspects of autonomous driving restriction method 400 may be completed through telematics unit 30 which may include one or more executable instructions incorporated into digital memory device 54 (memory) and carried out by electronic processing device 52 (processor). Skilled artisans will moreover see that telematics unit 30, mobile computing device 57, and data center 20 may be remotely located from each other. Method 400 is supported by telematics unit 30 being configured to establish one or more communication protocols with data center 20 and other remote entities via wireless carrier system 14. This configuration may be established by a vehicle manufacturer at or around the time of the telematics unit's assembly or after-market (e.g., via vehicle download using the afore-described communication system 10 or at a time of vehicle service, just to name a couple of examples). In at least one implementation, one or more instructions are provided to server 82 and stored on non-transitory computer-readable medium (e.g., database 84). In at least one implementation, one or more instructions are provided to the telematics unit 30 and stored on non-transitory computer-readable medium (e.g., digital memory device 54). Method 400 is also supported by telematics unit 30 being configured to establish one or more short-range wireless communication protocols with mobile computing device 57. This configuration may also be established by a vehicle manufacturer at or around the time of the telematics unit's assembly or after-market.

Method 400 begins at 401 in which the vehicle occupant (i.e., the vehicle's operator/driver; in other words—the system user) enters into the vehicle 12 and turns the vehicle to the ON state (i.e., starts the vehicle's ignition). In step 410, mobile computing device 57 sends its vehicle-occupant credential to telematics unit 30 and telematics unit 30 receives this credential package. In one or more embodiments, the vehicle-occupant credential is a virtual package that includes both the virtual vehicle key (with all driving mode parameters established therein) as well as identity information of the vehicle occupant (discussed above). In optional step 420, telematics unit 30 will send (transmit) the identity information of the vehicle occupant to data center 20 via wireless carrier system 14. In optional step 430, server 82 will receive the identity information and query databases 84 for any/all vehicle-operation permissions associated with the vehicle operator's identity information. For example, if the identity information indicates that the vehicle occupant has a driving permit, then the vehicle-operation permissions may be set to restrict the vehicle 12 from operating in the autonomous driving mode to ensure the vehicle occupant takes every opportunity to learn how to adequately operate vehicle 12. This restriction could include simply deactivating one or more features installed on a Level Two or Level Three system equipped vehicle (e.g., adaptive cruise control, lane assist, or IPAS) or it could include deactivating the vehicle from autonomously from being able to perform any/all dynamic driving tasks on a Level Four or Level Five system equipped vehicle. Furthermore, on the other hand, if the identity information indicates that the vehicle occupant is 15 years old or younger and/or does not have a driver license or driving permit, then the vehicle-operation permissions may be set to restrict the vehicle 12 from operating in the manual driving mode (e.g., when the vehicle is a Level Four or Level Five system).

In optional step 440, from data center 20, the vehicle-operation permissions are sent to telematics unit 30. Moreover, in this step, telematics unit 30 will review the vehicle-operation permissions and determine whether the vehicle-operation permissions trigger an operation constraint. As follows, vehicle 12 will allow or restrict activation of autonomous driving mode based on these vehicle-operation permissions. If the vehicle-operation permissions trigger the operation constraint and thus the vehicle is restricted to only operating in the manual operating mode, for example, because the occupant has a driving permit, then method 400 will move to step 450. Otherwise, since vehicle 12 will allow the implementation of its autonomous driving features, method 400 will move to step 480.

In step 450, telematics unit 30 will review the remaining information in the vehicle-occupant credential (e.g., the virtual vehicle key and any driving mode parameters embedded therein) and determine whether this vehicle-occupant credential is to trigger the operation constraint. In essence, telematics unit 30 will determine if the virtual vehicle key and its driving mode parameters is to trigger the operation constraint. As follows, vehicle 12 will allow or restrict activation of autonomous driving mode capabilities based on the vehicle-occupant credential (including the virtual vehicle key and any embedded driving mode parameters). In one example, the vehicle-occupant credential can restrict vehicle operations when the virtual vehicle key includes parameters that only allow operation of the vehicle while in a manual driving mode. Such parameters may be established by the owner of a fleet of vehicles used for the sole/primary purpose of administering driving exams to students attempting to be granted a driver license. As mentioned above, this restriction could include simply deactivating one or more features installed on a Level Two or Level Three system equipped vehicle (e.g., adaptive cruise control, lane assist, or IPAS) or it could include deactivating the vehicle from autonomously from being able to perform any/all dynamic driving tasks on a Level Four or Level Five system equipped vehicle. Moreover, if the vehicle-occupant credential triggers the operation constraint and thus the vehicle is restricted to only operating in the manual operating mode, for example, because the occupant has limited access and control of vehicle 12 for the purposes of their driving exam, then method 400 will move to optional step 460. Otherwise, since the credential (the virtual vehicle key and/or driving mode parameters) does not trigger the operation constraint, method 400 will move to step 480.

In optional step 460, upon the operation constraint being triggered, telematics unit 30 will generate a notification that informs the vehicle occupant the vehicle is restricted from operating in an autonomous driving mode. This notification may be exhibited on display 38 and may state language to the effect of "BASED ON THE CONTEXT OF YOUR DRIVING EXPERIENCE, AUTONOMOUS DRIVING MODE IS CURRENTLY DISABLED", or the like. Telematics unit 30 may also transmit this notification to mobile computing device 57, to be displayed on the device's user interface. The notification may also include a supporting audible warning from the audio system 36 such as, for example, chirps or dings (e.g., via an electronic/software chime module within the audio system). The notification may further/alternatively include a supporting haptic feedback warning from one or more vibratory devices (e.g., a piezo-electric device) installed in the driver seat or one or more passenger seats or steering wheel of vehicle 12.

In step 470, vehicle 12 will restrict the usage of the autonomous driving mode and thus the vehicle 12 can only continue operations without its self-driving functionality. As follows, if vehicle 12 begins method 400 in autonomous driving mode, vehicle 12 will automatically shift from this mode to the manual driving mode. As such, restricting the vehicle occupant from operating the vehicle 12 in this manner will ensure they cannot let the vehicle perform at least certain dynamic driving tasks. As mentioned above, this restriction could include simply deactivating one or more features installed on a Level Two or Level Three system equipped vehicle (e.g., adaptive cruise control, lane assist, or IPAS) or it could include deactivating the vehicle from autonomously from being able to perform any/all dynamic driving tasks on a Level Four or Level Five system equipped vehicle. After step 470, method 400 moves to completion 402.

In step 480, since the operation constraint remains untriggered, the vehicle 12 remains or is now allowed to operate in both the autonomous mode and the manual driving mode. As follows, the vehicle occupant can shift the vehicle from manual operations to autonomous operations and vice versa at their leisure. After step 480, method 400 moves to completion 402.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the system and/or method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A method to restrict vehicle operations, the method comprising:
   receiving, via a processor, a vehicle-occupant credential, wherein the vehicle-occupant credential includes a virtual vehicle key and occupant identity information;
   determining, via the processor, whether the vehicle-occupant credential triggers an operation constraint based on a driving experience level associated with the occupant identify information; and
   when the operation constraint is triggered, via the processor, restricting a vehicle from operating in an autonomous driving mode.

2. The method of claim 1, further comprising:
   when the operation constraint is triggered, via the processor, providing a notification configured to inform a vehicle occupant the vehicle is restricted from operating in the autonomous driving mode.

3. The method of claim 1, further comprising:
   when the operation constraint remains untriggered, via the processor, allowing the vehicle to operate in both the autonomous driving mode and manual driving mode.

4. The method of claim 1, further comprising:
   based on the vehicle-occupant credential, via the processor, receiving a vehicle-operation permission; and
   determining, via the processor, whether the vehicle-operation permission triggers the operation constraint.

5. The method of claim 4, wherein the vehicle-operation permission is received from a remote entity.

6. The method of claim 1, wherein the vehicle-occupant credential is received from a mobile computing device.

7. A system to restrict vehicle operations, the system comprising:
a memory configured to comprise one or more executable instructions and a processor configured to execute the executable instructions, wherein the executable instructions enable the processor to carry out the following steps:
receiving a vehicle-occupant credential, wherein the vehicle-occupant credential includes a virtual vehicle key and occupant identity information;
determining whether the vehicle-occupant credential triggers an operation constraint based on a driving experience level associated with the occupant identify information; and
when the operation constraint is triggered, restricting a vehicle from operating in an autonomous driving mode.

8. The system of claim 7, further comprising:
when the operation constraint is triggered, providing a notification configured to inform a vehicle occupant the vehicle is restricted from operating in the autonomous driving mode.

9. The system of claim 7, further comprising:
when the operation constraint remains untriggered, allowing the vehicle to operate in both the autonomous driving mode and manual driving mode.

10. The system of claim 7, further comprising:
based on the vehicle-occupant credential, receiving a vehicle-operation permission; and
determining whether the vehicle-operation permission triggers the operation constraint.

11. The system of claim 10, wherein the vehicle-operation permission is received from a remote entity.

12. The system of claim 7, wherein the vehicle-occupant credential is received from a mobile computing device.

13. A non-transitory and machine-readable medium having stored thereon executable instructions adapted to restrict vehicle operations, which when provided to a processor and executed thereby, causes the processor to carry out the following steps:
receiving a vehicle-occupant credential, wherein the vehicle-occupant credential includes a virtual vehicle key and occupant identity information;
determining whether the vehicle-occupant credential triggers an operation constraint based on a driving experience level associated with the occupant identify information; and
when the operation constraint is triggered, restricting a vehicle from operating in an autonomous driving mode.

14. The non-transitory and machine-readable memory of claim 13, further comprising:
when the operation constraint is triggered, providing a notification configured to inform a vehicle occupant the vehicle is restricted from operating in the autonomous driving mode.

15. The non-transitory and machine-readable memory of claim 13, further comprising:
when the operation constraint remains untriggered, allowing the vehicle to operate in both the autonomous driving mode and manual driving mode.

16. The non-transitory and machine-readable memory of claim 13, further comprising:
based on the vehicle-occupant credential, receiving a vehicle-operation permission; and
determining whether the vehicle-operation permission triggers the operation constraint.

17. The non-transitory and machine-readable memory of claim 16, wherein the vehicle-operation permission is received from a remote entity.

18. The non-transitory and machine-readable memory of claim 13, wherein the vehicle-occupant credential is received from a mobile computing device.

* * * * *